United States Patent
Regenscheit

(10) Patent No.: US 7,421,920 B2
(45) Date of Patent: *Sep. 9, 2008

(54) POWERSHIFT GEARBOX FOR CONSTRUCTION MACHINES, ESPECIALLY FOR A TRACTOR BACKHOE LOADER AND A TELESCOPIC HANDLER

(75) Inventor: Norman Regenscheit, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 365 days.

This patent is subject to a terminal disclaimer.

(21) Appl. No.: 10/562,029

(22) PCT Filed: Jun. 7, 2004

(86) PCT No.: PCT/EP2004/006122

§ 371 (c)(1),
(2), (4) Date: Jan. 25, 2006

(87) PCT Pub. No.: WO2005/003593

PCT Pub. Date: Jan. 13, 2005

(65) Prior Publication Data

US 2006/0213321 A1 Sep. 28, 2006

(30) Foreign Application Priority Data

Jul. 4, 2003 (DE) ................. 103 30 157

(51) Int. Cl.
 F16H 3/08 (2006.01)
 F16H 3/085 (2006.01)
(52) U.S. Cl. ...................... 74/331; 74/665 F
(58) Field of Classification Search ................ 74/325, 74/329, 330, 331, 333, 665 R, 665 F, 665 G, 74/665 GA
See application file for complete search history.

(56) References Cited

U.S. PATENT DOCUMENTS

| 4,245,519 A | * | 1/1981 | Herlitzek | 74/331 |
| 4,549,443 A | | 10/1985 | White | |
| 5,063,793 A | * | 11/1991 | McAskill | 74/360 |
| 5,743,142 A | * | 4/1998 | Leber et al. | 74/331 |
| 5,819,587 A | | 10/1998 | Leber et al. | |

(Continued)

FOREIGN PATENT DOCUMENTS

DE 35 21 932 A1 1/1987

(Continued)

*Primary Examiner*—Sherry Estremsky
(74) *Attorney, Agent, or Firm*—Davis Bujold & Daniels, P.L.L.C.

(57) ABSTRACT

A multi-geared high-low clutch for construction machines with a torque converter, a drive shaft, an output shaft and several jack shafts, with distributed idlers on the shafts, fixed wheels and shift clutches, which form several reduction gear units for the gearshift and direction circuit, containing four forward gears and two reverse gears, whereby output shaft is also used as a jack shaft for a gear, with which the corresponding jack shaft of forward gear unit and the corresponding jack shaft of another forward gear unit engage with drive shaft, where both jack shafts can be rotated in every desired angle position around drive shaft, whereby corresponding jack shafts of the gears, applied to drive shaft, are arranged one behind the other on a side of the drive shaft and whereby, that corresponding jack shafts of the gears, can currently be rotated around the next visibly arranged jack shaft.

13 Claims, 5 Drawing Sheets

U.S. PATENT DOCUMENTS

| | | | |
|---|---|---|---|
| 6,513,399 B2 * | 2/2003 | Lamela | 74/331 |
| 6,752,034 B2 | 6/2004 | Huber et al. | |
| 6,988,426 B2 * | 1/2006 | Calvert | 74/331 |
| 2003/0015050 A1 * | 1/2003 | Huber et al. | 74/331 |

FOREIGN PATENT DOCUMENTS

| | | |
|---|---|---|
| DE | 44-16 930 A1 | 11/1995 |
| DE | 101 31 329 A1 | 1/2003 |
| EP | 0 759 129 A1 | 11/1995 |
| WO | WO 9415116 A2 * | 7/1994 |
| WO | WO-02097301 A1 | 12/2002 |

\* cited by examiner

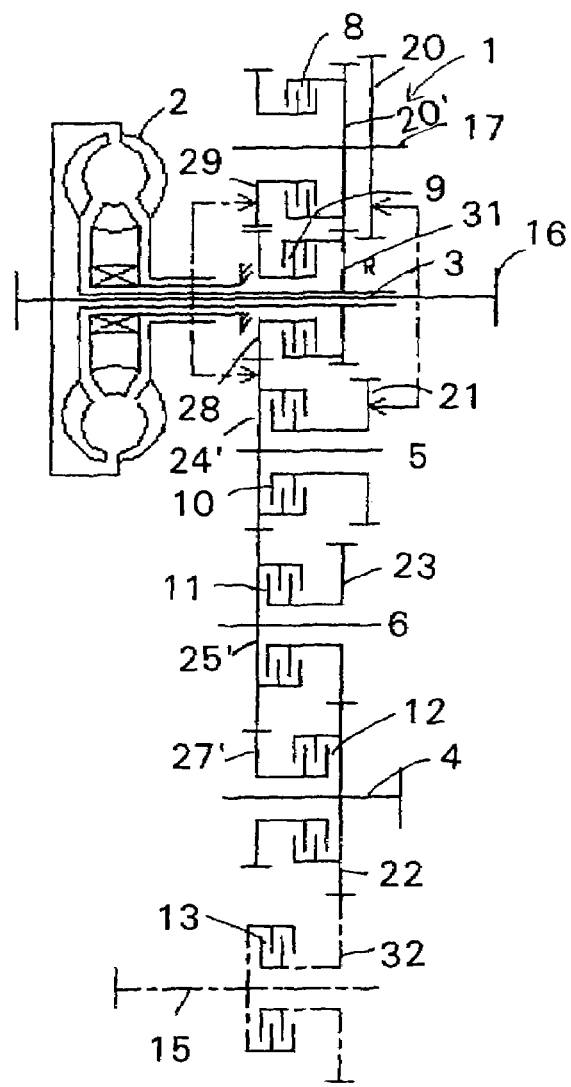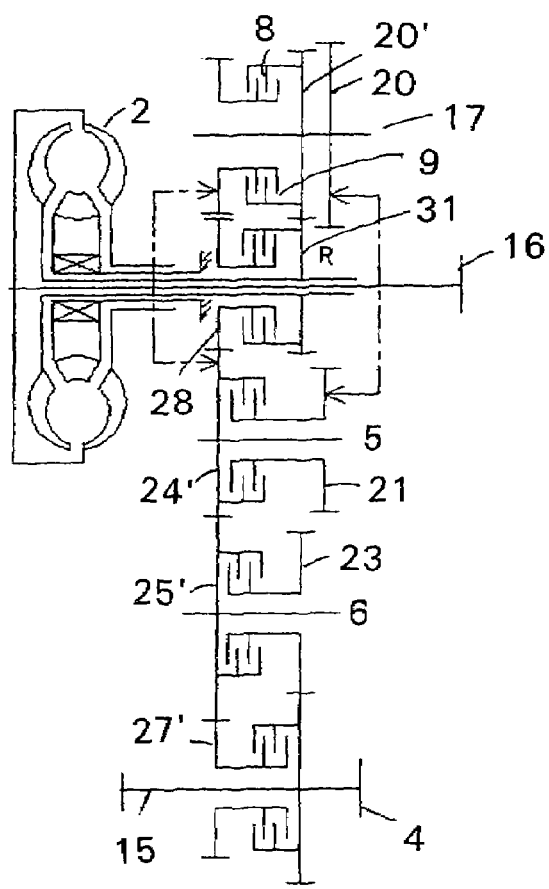
Fig. 1
Fig. 2

POWERSHIFT GEARBOX FOR CONSTRUCTION MACHINES, ESPECIALLY FOR A TRACTOR BACKHOE LOADER AND A TELESCOPIC HANDLER

This application is a national stage completion of PCT/EP2004/006122 filed Jun. 7, 2004 which claims priority from German Application Serial No. 103 30 157.7 filed Jul. 4, 2003.

FIELD OF THE INVENTION

The present invention concerns a powershift gearbox for construction machines, especially for a tractor backhoe loader and a telescopic handler.

BACKGROUND OF THE INVENTION

Such gear systems are usually implemented as reverse gear units and are fitted in many different construction machines, where the installation conditions, as a function of the type of motor vehicle, can fail differently. For example, the available fitting space, if it is extremely small, can fail. Furthermore, different axle bases between the transmission drive shaft and the transmission output shaft can occur; besides, depending on a type of motor vehicle, a certain axle placement between the entrance shaft and the output shaft of the gear system is necessary.

An excavator loader vehicle demands a compact building method, for example, due to the central installation and the clearance. A telescopic handler of a motor vehicle demands a slim, tall silhouette with small lateral discharges or a low building method with the possibility of the lateral expansion upon execution.

Further, in most areas of application in construction machines, at least one auxiliary drive is needed for the hydraulics of the machine, for example. The tasks, which a reverse gear unit has to fulfill, are therefore conditional by the design of the type of motor vehicle and are very different. These requirements must be fulfilled within the overall axial length and width of the transmission.

Transmissions of the kind initially specified have different requirements regarding the positions of the drive shafts and the number of the necessary forward and reverse gears.

For example, excavator loader transmissions have requirements regarding a short distance between the output shaft and drive shaft (to the rear wheels), which is conditional to the position by the fitting space in the vehicle. Further, it should be given as much clearance as possible, which means that the engine/gear unit should sit as high as possible. With excavator loaders, in most cases, the rear wheels are clearly larger than the front wheels, whereby the vertical position of the rear axle is clearly higher than that of the front axle. Typical distances, which result, are 160-180 millimeters in the vertical direction without lateral misalignment or with a small lateral misalignment.

Excavator loaders usually exhibit an insertable front wheel drive, whereby the front wheel drive lies lower to the rear wheels, due to the smaller front wheels at the transmission opposite the output. Since the engine surface mounting is also on the front side of the transmission, there is the restriction of the building space, in which the front wheel drive is arranged outside or below, the converter bell.

The telescopic handlers have a permanent four wheel drive. The front wheel drive is in the same position as the rear output, whereby the transmission needs only one output shaft. In addition to the body of the vehicle, the gears of the telescopic handlers have other requirements regarding the axle base that the excavator loader transmissions. In many cases, for example, a large lateral misalignment of the output is necessary for drive. This demand results from the lateral installation position of the engine. Thus, a horizontal misalignment is necessary for the centric drive shaft. In most cases until now, the bypass of the current force to the middle of the vehicle was achieved by the installation of an axle distributor gear.

A further typical installation position is possible for the centric arrangement of the gear/motor unit with telescopic handlers with a lateral construction. Here it may provide no lateral misalignment of the output (related to the propulsion); the vertical wheel base is clearly larger opposite a telescopic handler with a transfer case, as well as opposite a gear system of an excavator loader.

From EP 0 759 129 B1 an announcement of a read-adjustable reverse gear unit is known, which exhibits a drive wheel set and a distributor wheel set in the allocation of coupling shift clutches, fixed wheels and idlers on several forward shafts, with which long and short axle bases can be realized. For long axle bases, it is proposed that the jack shafts are essential in the ordering of the drive shaft and the output shaft, whereby, depending upon the desired gear, different combinations of jack shafts are involved in power transmission. With short axle bases, the jack shafts are positioned in a circle around the drive shaft, which is how their position to each other is already determined. With this reverse gear, different shaft arrangements are proposed for the realization of different axle bases.

Furthermore, in DE 101 31 329, a read-adjustable, more usual reverse gear unit was announced with a drive shaft, an output shaft and several jack shafts with idlers distributed on the shafts, fixed wheels and coupling shift clutches, which form several reduction gear units at the gearshift and direction circuit. Here the individual shafts are combined into a reverse gear unit and a transmission unit, whereby the transmission unit, at any side of the drive, is proposed and the transmission unit is attached to the reverse gear unit, so that the reverse transmission unit and the transmission unit are behind each other on the drive shaft and organized on a side of the drive shaft.

With the transmission concepts being the state of the art, the axle base cannot variably be arranged in an unfavorable way. Due to the clutch and shaft arrangement, as well as the engagement of certain wheels, they exist with each other in a small space concerning the positioning of the wheel base (drive to output). Often a construction modification, in order to be able to meet changed requirements to the axle base, only at the highest possible cost, which means that for the realization of different axle bases, different transmission concepts must be developed.

For example, it is necessary to introduce an intermediate shaft with existing transmission concepts in order to come from a short vertical axle base to a large axle base. In order to obtain a large lateral misalignment, a transfer case must be cultivated.

The existing kinematic diagrams exhibit the disadvantage that the outward transmission is only conditionally, flexibly shaped. Thus it is often impossible to satisfy a transmission concept of the requirements to the fitting space of the various types of motor vehicles.

Moreover, many of the usual kinds of transmissions do not exhibit the necessary flexibility, especially modularity, in order to correct the different requirements of the numbers of threads in a transmission concept. For the realization of these different numbers of threads, at least often complex re-designs are necessary. With some gear construction ways, it is possible, by "taking" a clutch from a 5-gear, respectively 6-gear transmission, to make it suitable for a 4-gear transmission. However, this does not result in a significant reduction in cost, since the concept for, namely, 6-gear transmission is laid out.

The present invention is based on the task of creating a high-low clutch for construction machines, in particular for excavator loaders and telescopic handlers, a task which circumvents the disadvantages of the state of the art. In particular, very small and very large axle bases are made possible. Moreover, the possible shaft arrangements of the different requirements are supposed to satisfy excavator loader transmissions telescopic handler transmissions.

SUMMARY OF THE INVENTION

A read-adjustable, multi-geared reverse gear unit with a drive shaft, an output shaft and several jack shafts with these idlers distributed on the shafts, fixed wheels and shift clutches, which form several reduction gear units to the gearshift and direction circuit is suggested, with which a forward gear unit (direction unit) corresponding jack shafts and a further forward gear unit (direction unit) engage corresponding jack shafts with the drive shaft, whereby the jack shafts, which engage with the drive shaft, in which each desired angle position is able to rotate around the drive shaft.

According to the invention, the gears of the corresponding jack shafts are arranged one behind the other on a side of the drive shaft in relation to the drive shaft.

In a favorable way, the gears of the corresponding jack shafts can currently be rotated around the next spatially visible ordered jack shaft, which is in the direction of the drive shafts in a large angle area. Therefore, almost every building form can be realized, where the transmission of the requirements for excavator loader transmissions and for telescopic handler transmissions, proposed in this invention, is sufficient. This transmission, according to the invention, primarily covers four forward and two reverse gears.

The position of the front wheel drive can be arranged variably in accordance with this invention, since the front wheel drive in a large angle window can be arranged around the output. For an excavator loader front wheel drive can be variable inserted. For a telescopic handler transmission, the output is united to the rear and forward in a shaft.

BRIEF DESCRIPTION OF THE DRAWINGS

The invention will now be described, by way of example, with reference to the accompanying drawings in which:

FIG. 1 is a kinematic diagram of an initial embodiment of the transmission proposed by this invention;

FIG. 2 is a kinematic diagram of a second embodiment of the transmission proposed by this invention;

DETAILED DESCRIPTION OF THE INVENTION

Figure 3:
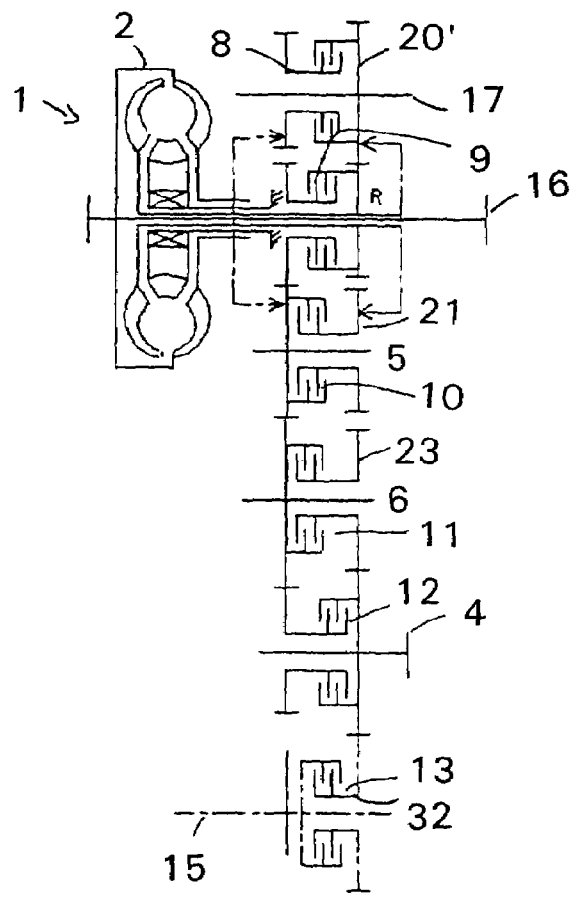
FIGS. 3 to 7 are further kinematic diagrams of a transmission proposed by the present invention.

In FIG. 1, a read-adjustable, multi-geared reverse gear transmission 1 is shown, which has six forward gears and three reverse gears, with a torque converter 2, a drive shaft 3, an output shaft 4 and several jack shafts 5, 6, 7, 17 with these idlers distributed on the shafts, fixed wheels and shift clutches 8, 9, 10, 11, 12, which form several reduction gear units for the gearshift and direction circuit. Here the shift clutches 8 and 10 will be inserted as forward clutches; the rear clutch is provided with reference symbol 9. Furthermore, according to the transmission proposed in this invention, a separate, insertable front wheel drive 15 is proposed over a shift clutch 13, which is to be connected to a fixed wheel 22 of output shaft 4 over an idler 32, whereby this diagram is suitable for installation in excavator loaders in particular.

As can be inferred from FIG. 1, an auxiliary drive is proposed, for example PTO 16, which is primarily connected to the drive shaft 3.

The corresponding jack shaft 17 of a forward gear unit and the corresponding jack shaft of the further forward gear unit engage with the drive shaft 3. Both jack shafts are able to be rotated around drive shaft 3 in every desired angle position.

In accordance with the invention, the shaft 6 can be rotated around shaft 5 in a very large angle area. In addition, the output shaft 4 can also be rotated around shaft 6 in a large angle area. According to the concept as proposed in the invention, the transmission form can adapt to the building space conditions, as well as to the requirements of various construction machine types.

The drive shaft 3 engages with shafts 17 and 5. For this purpose, it is connected by an fixed wheel 31 with a fixed wheel 20' of shaft 17 and by shift clutch 8 and an idler 28 with an fixed wheel 24' of shaft 5. Shaft 17 covers a further fixed wheel 20, which is engaged with an idler 21 of shaft 5. This idler 21 can be connected to rotate by shift clutch 10 with shaft 5. Furthermore, fixed wheel 24' of shaft 5 with an idler 29 of shaft 17, is connected by shift clutch 8 with shaft 17. The latch of shift clutch 9 causes a direction of rotation reversal of the output shaft and activates the reverse gears in connection with shift clutches 11 and 12.

As the Figure shows, the fixed wheel 24' of shaft 5 engages with a fixed wheel 25' of shaft 6; an idler 23 of shaft 6 engages with a fixed wheel 22' of output shaft 4 and is connected by shift clutch 11 with shaft 6. Furthermore, fixed wheel 25' of shaft 6 engages with a fixed wheel 27' of output shaft 4, which is connected by shift clutch 12. In addition, the fixed wheel 22' engages with output shaft 4 with then idler 32 of the front wheel drive 15.

In FIG. 2, a variant of the diagram according to FIG. 1 is shown, which exhibits a permanent front wheel drive and, in particular, is suitable for telescopic handlers. Here front and rear wheel drive on a shaft takes place, namely on drive shaft 4.

The clutch combinations for representing four forward gears and two reverse gears of the transmission, which is shown in FIGS. 1 and 2, are as follows:

|  | Forward |
|---|---|
| 1. Gear | shift clutches 8 and 11 |
| 2. Gear | shift clutches 8 and 12 |
| 3. Gear | shift clutches 10 and 11 |
| 4. Gear | shift clutches 10 and 12 |
|  | Reverse |
| 5. Gear | shift clutches 9 and 11 |
| 6. Gear | shift clutches 9 and 12 |

The basic principle of the visible kinematic diagram shows ten wheels.

Adding one or more wheels can result in a wide spectrum of transmission ratios and transmission ratio spreads.

Figure 4:
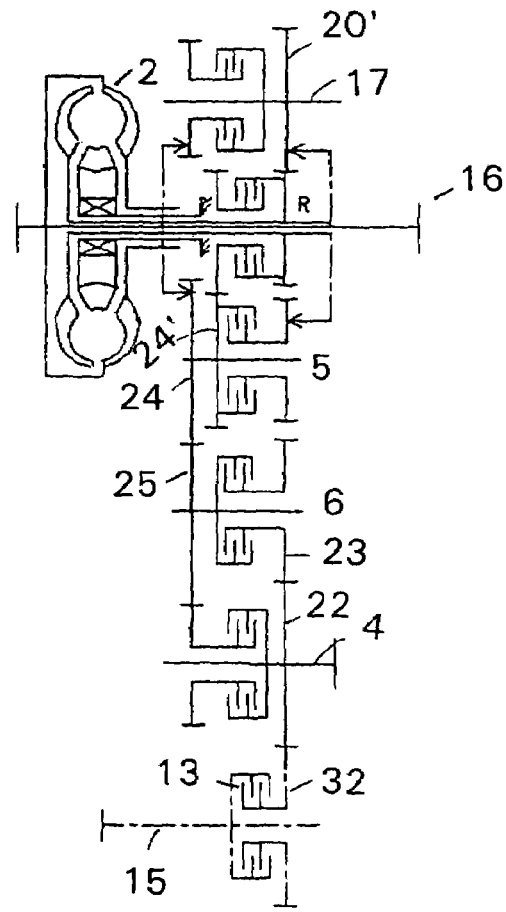

In FIGS. 3, 4, 5, 6, and 7, further embodiments with insertable front wheel drive are represented, which differ from the embodiments, which have already been explained, by the number of wheels. A permanent front wheel drive is also proposed, which is similar to the example shown in FIG. 2. Therefore, for example, the diagram according to FIG. 3 differs from that of FIG. 1, that only on shaft 17 is an arranged, fixed wheel 20, so that the assigned idler 21 of shaft 5 of shift clutch 10 engages with this (another transmission ratio can be reached by the additional fixed wheel in FIG. 1). In FIG. 4, the output shaft 4 exhibits a fixed wheel 22, which couples with idler 23 of shaft 6 and is no longer with shift clutch 12. Likewise, shafts 5 and 6 from shift clutches 10 and 11, respectively, exhibit independent fixed wheels 24, 25 (here, shaft 5 covers two fixed wheels 24, 24').

Figure 5:
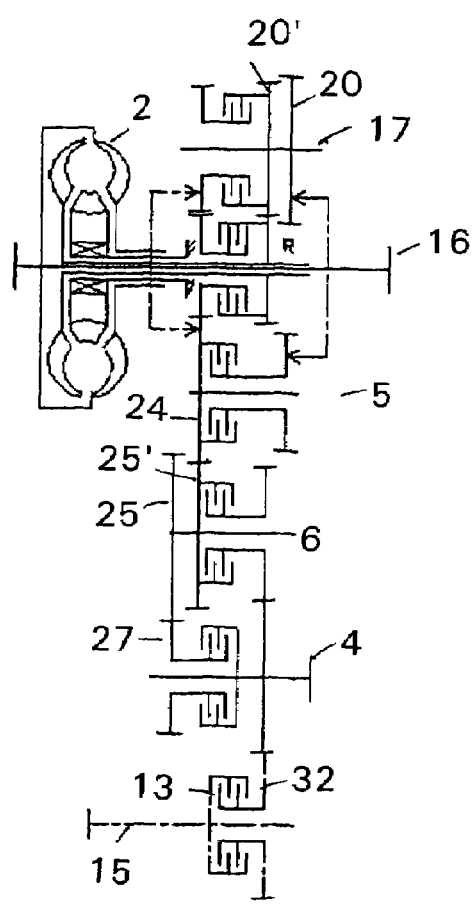

According to FIG. 5, two fixed wheels 25, 25' on shaft 6 are proposed, where the fixed wheel 25 is connected to shaft 4 (idler 27), and idler 25' is connected to shaft 5 (fixed wheel 24').

Figure 6:
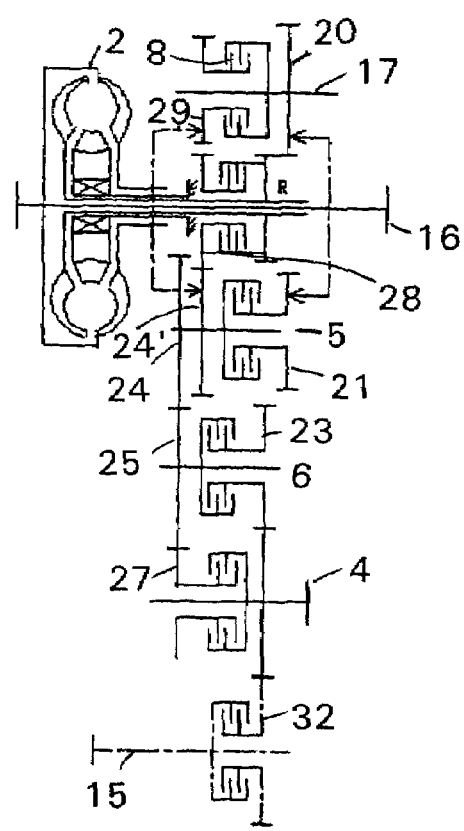

The example shown in FIG. 6 differs from the diagram in FIG. 1 in that shaft 5 covers two fixed wheels 24, 24', whereby fixed wheel 24 is connected to fixed wheel 25 of shaft 6, and fixed wheel 24' is connected to idler 29 of shaft 17 and with idler 28 of shaft 3. Furthermore, fixed wheel 25 of shaft 6 is not coupled with shift clutch 11 and fixed wheel 22 of shaft 4 is not coupled with shift clutch 12.

Figure 7:
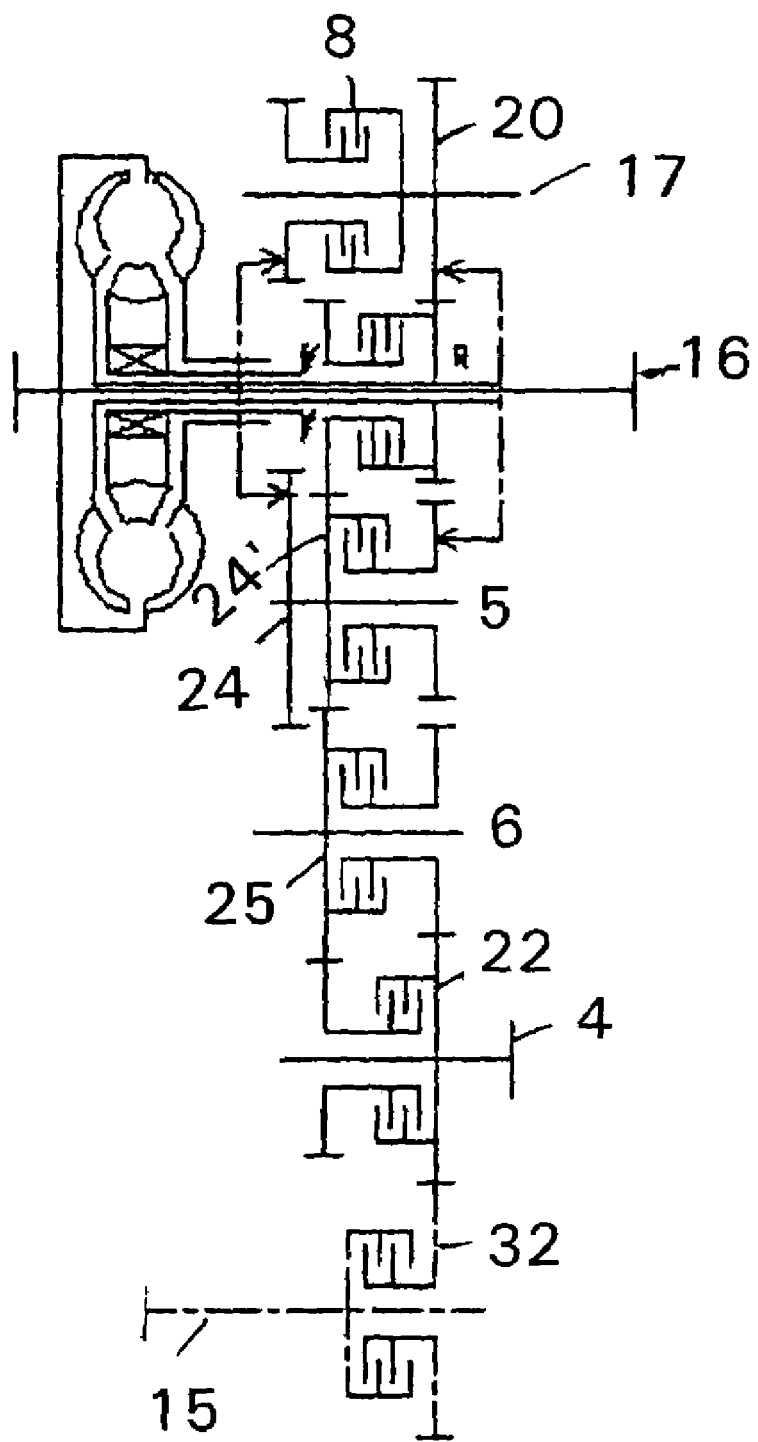

According to FIG. 7, the example differs from the diagram of FIG. 4 in that fixed wheels 25 and 22 respectively, of shafts 6 and 4, are connected to shift clutches 11 and 12, respectively.

Figure 8A:
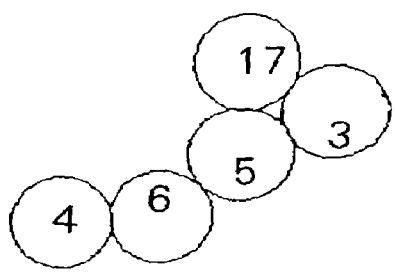
FIGS. 8A, 8B, 8C, 9A and 9B are representations of the shaft arrangement for different diagrams of a transmission, according to the present invention.
Figure 8B:
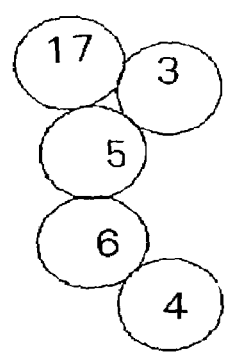
Figure 8C:
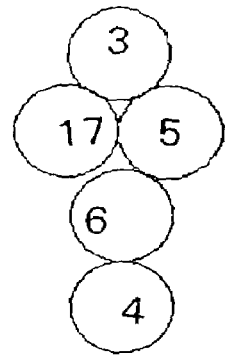

FIGS. 8A, 8B, 8C illustrate three possibilities of the positioning of the shafts at the installation with a telescopic handler. As has already been explained, shafts 17 and 5 can be rotated around output shaft 3, shaft 4 can be rotated around shaft 6, and shaft 6 can be rotated around shaft 5.

Figure 9A:
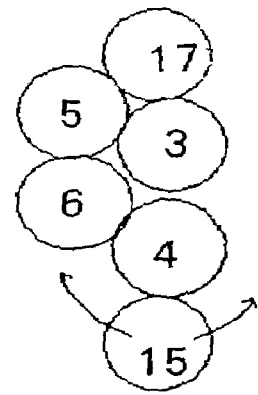
Figure 9B:
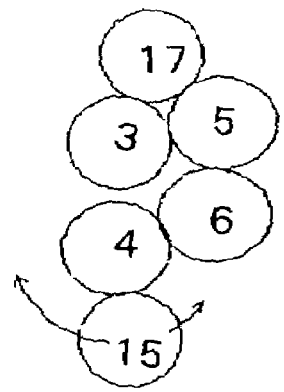

In FIGS. 9A and 9B, two variants of the shaft arrangement regarding an Excavator loader with insertable front wheel drive 15 are shown. It is noticed here, that shaft 15 (front wheel drive) can be rotated around output shaft 4; shafts 17 and 5 are able to be rotated around drive shaft 3, so that a very high installation flexibility is ensured.

In the framework, which is not further represented by the diagrams, the possibility exists of creating a transmission with six forward gears and three reverse gears by adding an entire shaft.

The possibility also exists that front wheel drive shaft 15 is arranged over a fixed wheel (not shown) with idler 23, whereby idler 23 is arranged on jack shaft 6.

The invention claimed is:

1. A multi-geared power shift transmission for a construction machine providing improved installation flexibility, the transmission comprising:
    a torque converter (2);
    a drive shaft (3) being drivingly coupled to the torque converter (2);
    a first counter shaft (5);
    a second counter shaft (6);
    a third counter shaft (17); and
    an output shaft (4) for supplying driving power;
and each of the drive shaft (3), the output shaft (4), the first counter shaft (5), the second counter shaft (6) and the third counter shaft (17) having a gear unit comprising at least one of a fixed gear wheel, an idler gear wheel and a shift clutch (8, 9, 10, 11, 12, 13), which couples the idler gear wheel to the respective shaft, such that up to four forward gear ratios and two reverse gear ratios can be engaged;
    the gear unit of the drive shaft (3) is only directly drivingly engagable with a component of the gear unit of the first counter shaft (5) and a component of the gear unit of the third counter shaft (17);
    the gear unit of the first counter shaft (5) is only directly drivingly engagable with a component of the gear unit of the drive shaft (3), a component of the gear unit of the third counter shaft (17) and a component of the gear unit of the second counter shaft (6);
    the gear unit of the second counter shaft (6) is only directly drivingly engagable with a component of the gear unit of the first counter shaft (5) and a component of the gear unit of the output shaft (4);
    the gear unit of the third counter shaft (17) is only directly drivingly engagable with a component of the gear unit of the drive shaft (3) and a component of the gear unit of the first counter shaft (5); and
    the gear unit of the output shaft (4) is directly drivingly engagable with at least a component of the gear unit of the second counter shaft (6),
    whereby that the transmission provides improved installation flexibility.

2. The multi-geared power shift transmission according to claim 1, wherein the transmission further includes a front wheel drive shaft (15) which drivingly engages with a fixed gear wheel of the gear unit of the output shaft (4) when a shift clutch (14) of the front wheel drive shaft (15) is engaged.

3. The multi-geared power shift transmission according to claim 2, wherein the front wheel drive shaft (15) is permanently coupled to a component of the gear unit of the output shaft (4) so that the output shaft (4) provides both front wheel and rear wheel drive.

4. The multi-geared power shift transmission according to claim 2, wherein the front wheel drive shaft (15) is a part time drive which is engagable, via an idler gear wheel, with the at least one fixed gear wheel of the second counter shaft (6).

5. The multi-geared power shift transmission according to claim 2, wherein the transmission includes an auxiliary drive (16) for driving additional equipment.

6. The multi-geared power shift transmission according to claim 2, wherein the transmission is incorporated into one of a telescopic handler and an excavator loader.

7. The multi-geared power shift transmission according to claim 1, wherein at least one of the gear unit of the drive shaft (3), the gear unit of the output shaft (4), the gear unit of the first counter shaft (5), the gear unit of the second counter shaft (6) and the gear unit of the third counter shaft (17) has a second fixed gear wheel which provides the transmission with an increased range of transmission ratios.

8. A multi-geared power shift transmission of a telescopic handler and an excavator loader which provides improved installation flexibility, the transmission comprising:
    a torque converter (2);
    a drive shaft (3) being drivingly coupled to the torque converter (2);
    a first counter shaft (5);
    a second counter shaft (6);
    a third counter shaft (17); and
    an output shaft (4) for supplying driving power;
and each of the drive shaft (3), the output shaft (4), the first counter shaft (5), the second counter shaft (6) and the third counter shaft (17) having a gear unit comprising at least one of a fixed gear wheel, an idler gear wheel and a shift clutch (8, 9, 10, 11, 12, 13), which couples the idler gear wheel to the respective shaft, such that up to four forward gear ratios and two reverse gear ratios can be engaged;

the gear unit of the drive shaft (3) is only directly drivingly engagable with a component of the gear unit of the first counter shaft (5) and a component of the gear unit of the third counter shaft (17);

the gear unit of the first counter shaft (5) is only directly drivingly engagable with a component of the gear unit of the drive shaft (3), a component of the gear unit of the third counter shaft (17) and a component of the gear unit of the second counter shaft (6);

the gear unit of the second counter shaft (6) is only directly drivingly engagable with a component of the gear unit of the first counter shaft (5) and a component of the gear unit of the output shaft (4);

the gear unit of the third counter shaft (17) is only directly drivingly engagable with a component of the gear unit of the drive shaft (3) and a component of the gear unit of the first counter shaft (5);

the gear unit of the output shaft (4) is directly drivingly engagable with at least a component of the gear unit of the second counter shaft (6);

whereby that the transmission provides improved installation flexibility; and an auxiliary drive (16), for driving additional equipment, extends within and through the drive shaft (3).

9. The multi-geared power shift transmission according to claim 8, wherein the transmission further includes a front wheel drive shaft (15) which drivingly engages with a fixed gear wheel of the gear unit of the output shaft (4) when a shift clutch (14) of the front wheel drive shaft (15) is engaged.

10. The multi-geared power shift transmission according to claim 9, wherein the front wheel drive shaft (15) is permanently coupled to the gear unit of the output shaft (4) so that the output shaft (4) provides both front wheel and rear wheel drive.

11. The multi-geared power shift transmission according to claim 9, wherein the front wheel drive shaft (15) is a part time drive which is engagable, via an idler gear wheel, with the at least one fixed gear wheel of the second counter shaft (6).

12. The multi-geared power shift transmission according to claim 8, wherein at least one of the gear unit of the drive shaft (3), the gear unit of the output shaft (4), the gear unit of the first counter shaft (5), the gear unit of the second counter shaft (6) and the gear unit of the third counter shaft (17) has a second fixed gear wheel which provides the transmission with an increased range of transmission ratios.

13. A multi-geared power shift transmission for a construction machine providing improved installation flexibility, the transmission comprising:

a torque converter (2);

a drive shaft (3) being drivingly coupled to the torque converter (2);

a first counter shaft (5, 6, 7);

a second counter shaft (5, 6, 7);

a subsequent counter shaft (17); and an output shaft (4) for supplying driving power;

and each of the drive shaft (3), the output shaft (4), the first counter shaft (5, 6, 7), the second counter shaft (5, 6, 7), the subsequent counter shaft (17) having a gear unit comprising at least one fixed gear wheel, an idler gear wheel and a shift clutch (8, 9, 10, 11, 12, 13), which couples the idler gear wheel to the respective shaft, such that four forward gear ratios and two reverse gear ratios can be engaged;

the gear unit of the drive shaft (3) is only directly drivingly engagable with a component of the gear unit of the first counter shaft (5, 6, 7) and a component of the gear unit of the subsequent counter shaft (17);

the gear unit of the first counter shaft (5, 6, 7) is only directly drivingly engagable with a component of the gear unit of the drive shaft (3), a component of the gear unit of the subsequent counter shaft (17) and a component of the gear unit of the second counter shaft (5, 6, 7);

the gear unit of the second counter shaft (5, 6, 7) is only directly drivingly engagable with a component of the gear unit of the first counter shaft (5, 6, 7) and a component of the gear unit of the output shaft (4);

the gear unit of the subsequent counter shaft (17) is only directly drivingly engagable with a component of the gear unit of the drive shaft (3) and a component of the gear unit of the first counter shaft (5, 6, 7); and the gear unit of the output shaft (4) is directly drivingly engagable with at least a component of the gear unit of the second counter shaft (5, 6, 7).

\* \* \* \* \*